US009874755B2

(12) United States Patent
Tempel et al.

(10) Patent No.: US 9,874,755 B2
(45) Date of Patent: Jan. 23, 2018

(54) ADJUSTABLE DUAL-SCREEN HEAD-MOUNTED DISPLAYS

(71) Applicant: Oculus VR, LLC, Menlo Park, CA (US)

(72) Inventors: Mark Alan Tempel, Sammamish, WA (US); Jared I. Drinkwater, Auburn, WA (US); Robin Michael Miller, Redmond, WA (US); Joseph Patrick Sullivan, Issaquah, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 137 days.

(21) Appl. No.: 14/861,917

(22) Filed: Sep. 22, 2015

(65) Prior Publication Data

US 2016/0363773 A1 Dec. 15, 2016

Related U.S. Application Data

(60) Provisional application No. 62/175,919, filed on Jun. 15, 2015.

(51) Int. Cl.
*G02B 27/01* (2006.01)
(52) U.S. Cl.
CPC .. *G02B 27/0176* (2013.01); *G02B 2027/0154* (2013.01); *G02B 2027/0161* (2013.01)
(58) Field of Classification Search
CPC .... G02B 2027/0154; G02B 2027/0161; G02B 27/0176
See application file for complete search history.

(56) References Cited

U.S. PATENT DOCUMENTS

| 5,347,400 A * | 9/1994 | Hunter | G02B 3/08 345/7 |
| 6,072,626 A * | 6/2000 | Ichikawa | G02B 7/12 359/416 |
| 2006/0072206 A1* | 4/2006 | Tsuyuki | G02B 27/0172 359/631 |
| 2009/0147358 A1* | 6/2009 | Charlesworth | G02B 27/0176 359/481 |
| 2012/0218301 A1* | 8/2012 | Miller | G02B 27/017 345/633 |
| 2014/0266986 A1* | 9/2014 | Magyari | G02B 27/0172 345/8 |
| 2015/0234189 A1* | 8/2015 | Lyons | G02B 27/0172 345/174 |
| 2016/0320612 A1* | 11/2016 | Zhang | G02B 27/0006 |

* cited by examiner

*Primary Examiner* — Viet Pham
(74) *Attorney, Agent, or Firm* — Morgan, Lewis & Bockius LLP

(57) ABSTRACT

A head-mounted display includes a first display screen and a second display screen to display images to respective eyes of a user. The head-mounted display further includes a first member comprising a first rack and a second member comprising a second rack. The first member is coupled to the first display screen, and the second member is coupled to the second display screen. The head-mounted display includes a button and a gear train to transfer a linear sliding motion of the button to a linear motion of the first rack in a first direction and a linear motion of the second rack in a second direction opposite to the first direction. The gear train includes a first gear engaged with the first rack and a second gear concurrently engaged with the first gear and the second rack.

16 Claims, 12 Drawing Sheets

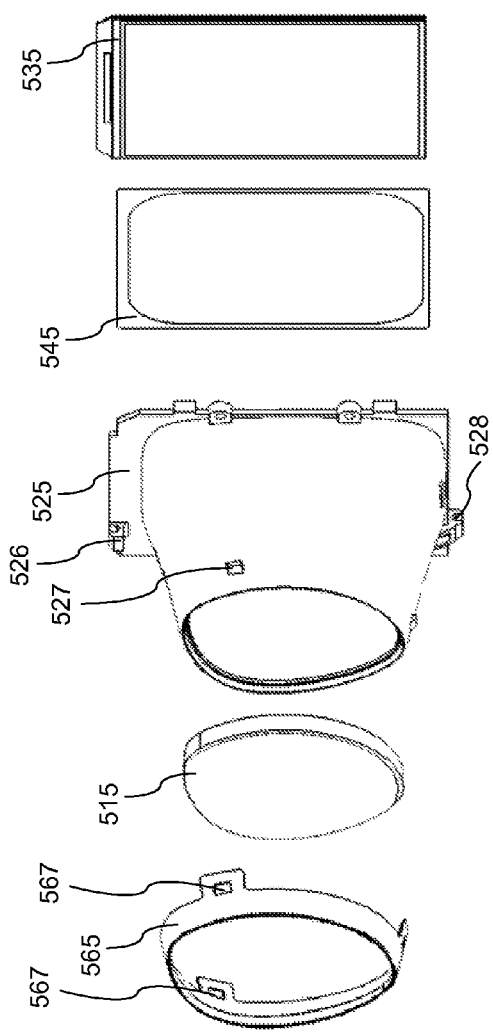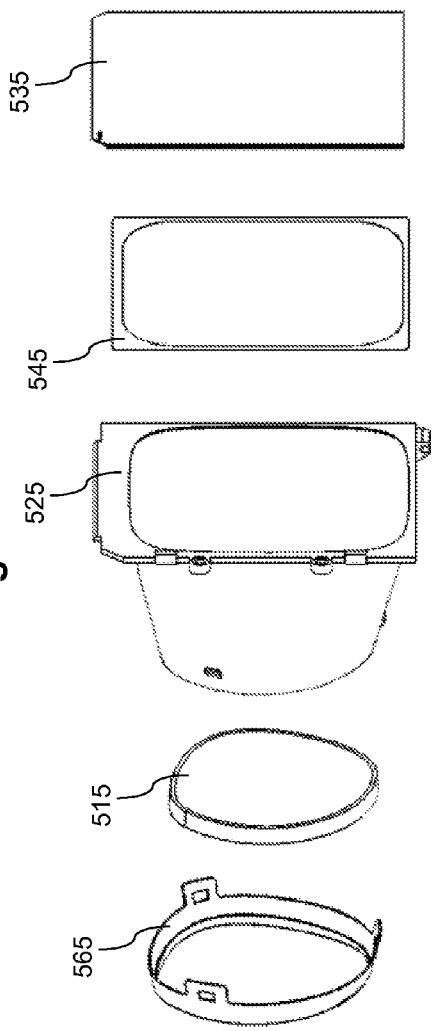

ADJUSTABLE DUAL-SCREEN HEAD-MOUNTED DISPLAYS

RELATED APPLICATIONS

This application claims priority to U.S. Provisional Patent Application Ser. No. 62/175,919, filed Jun. 15, 2015, entitled "Adjustable Dual-Screen Head-Mounted Displays," which application is incorporated by reference in its entirety.

TECHNICAL FIELD

This application relates generally to wearable technology and virtual-reality technology, including but not limited to a head-mounted display.

BACKGROUND

Virtual-reality head-mounted displays have wide applications in various fields, including engineering design, medical surgery practice, military simulated practice, and video gaming. For example, a user wears a virtual-reality head-mounted display integrated with audio headphones while playing video games so that the user can have an interactive experience in an immersive virtual environment.

However, it may be difficult for a user to properly adjust and comfortably wear the head-mounted displays and the integrated audio systems using existing technology, which may negatively affect the user's experience. Also, use of a single screen to provide images to both eyes may negatively affect the image quality.

SUMMARY

In accordance with some embodiments, a head-mounted display includes a first display screen and a second display screen to display images to respective eyes of a user. The head-mounted display further includes a first member comprising a first rack and a second member comprising a second rack. The first member is coupled to the first display screen, and the second member is coupled to the second display screen. The head-mounted display includes a button and a gear train to transfer a linear sliding motion of the button to a linear motion of the first rack in a first direction and a linear motion of the second rack in a second direction opposite to the first direction. The gear train includes a first gear engaged with the first rack and a second gear concurrently engaged with the first gear and the second rack.

In accordance with some embodiments, a head-mounted display includes a first eye cup and a second eye cup corresponding to respective eyes of a user. The head-mounted display also includes a first display screen coupled to the first eye cup and a second display screen coupled to the second eye cup. The first display screen and the second display screen display images to the respective eyes of the user. The head-mounted display further includes a first member comprising a first rack and a second member comprising a second rack. The first member is coupled to the first eye cup to press the first display screen between the first member and the first eye cup. The second member is coupled to the second eye cup to press the second display screen between the second member and the second eye cup. The head-mounted display also includes a button and a gear train to transfer a linear sliding motion of the button to a linear motion of the first rack in a first direction and a linear motion of the second rack in a second direction opposite to the first direction. The gear train includes a first gear engaged with the first rack and a second gear engaged with the second rack and the first gear.

In accordance with some embodiments, an assembly to position two displays to provide views to a user's eyes includes a first member comprising a first rack and a second member comprising a second rack. The first member is coupled to a first display screen and the second member is coupled to a second display screen. The assembly also includes a button and a gear train to transfer a linear sliding motion of the button to a linear motion of the first rack in a first direction and a linear motion of the second rack in a second direction opposite to the first direction. The gear train includes a first gear engaged with the first rack and a second gear concurrently engaged with the first gear and the second rack.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 3A-3B are exploded views illustrating components of a head-mounted display in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
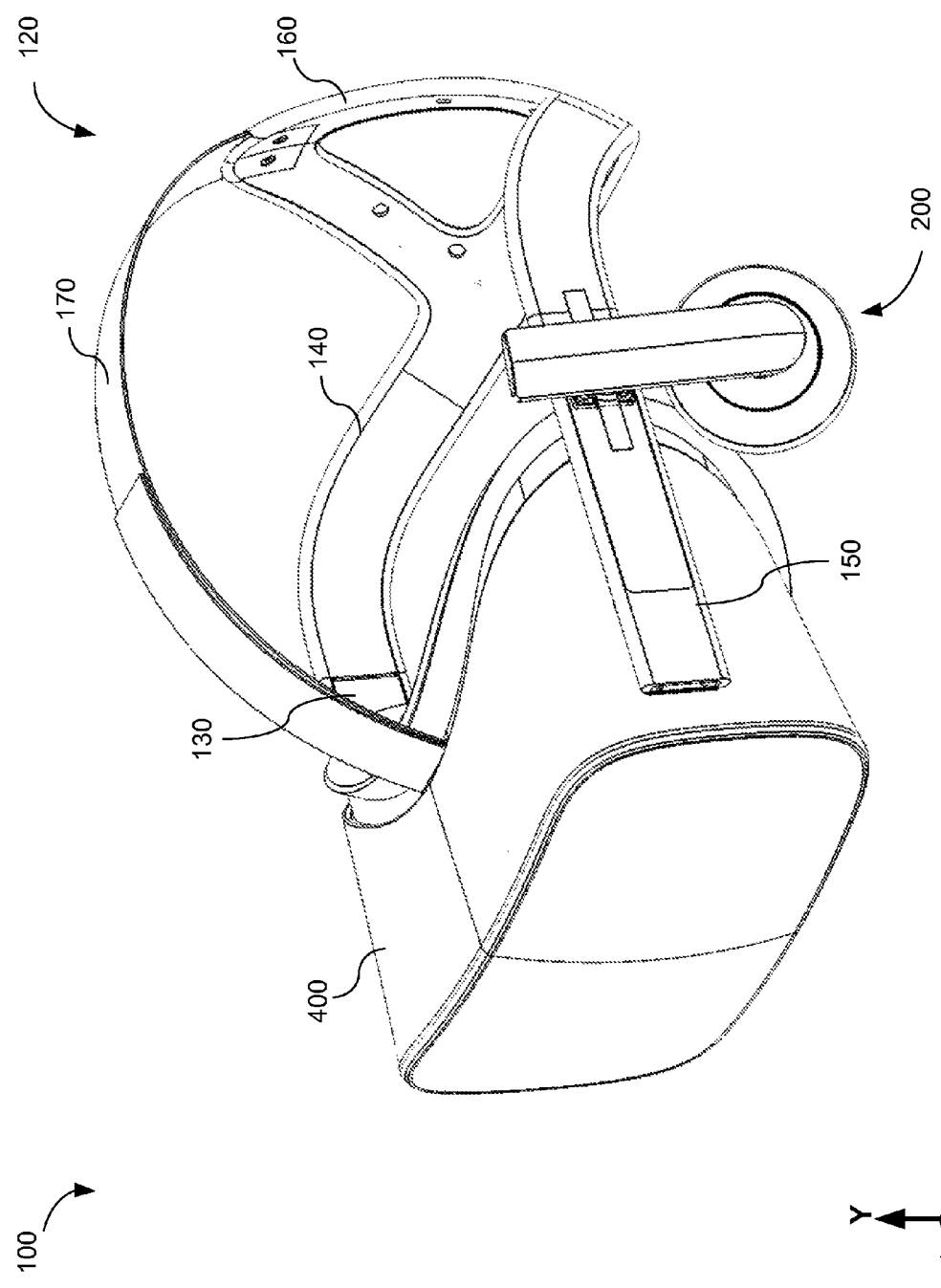
FIG. 1 is a perspective view of a head-mounted display system in accordance with some embodiments.

FIG. 1 is a perspective view of a head-mounted display system 100 in accordance with some embodiments. In some embodiments, the head-mounted display system 100 comprises a head-mounted display 400, a strap system 120, and a detachable audio subsystem 200. Although not shown due to the perspective, the head-mounted system 100 may have two audio subsystems located on left and right sides to provide audio signals to the user's left and right ears. Each of the left and right audio subsystems may use substantially symmetric structures for coupling the speaker to a corresponding rigid segment of the strap system 120.

The strap system 120 is used for mounting the head-mounted display 200 on a user's head. In the example of FIG. 1, the strap 120 comprises a rigid segment 130, a semi-rigid segment 140, and a rigid segment 150 that are coupled to each other to adjustably wrap around side and back portions of the user's head.

In some embodiments, the strap 120 comprises a single and continuous semi-rigid segment 140 including two arc portions, and each arc portion is to extend from above a user's ears to below the user's occipital lobe to conform to a portion of the user's head. Alternatively, the strap 120 may comprise two separate and symmetric semi-rigid segments each including an arc portion.

In some embodiments, the rigid segments 130 and 150 are respectively connected to the semi-rigid segment 140. The rigid segments 130 and 150 are also respectively coupled to the head-mounted display 400 and positioned on respective sides of the user's head to extend along the lateral dimension (e.g., the Z dimension in FIG. 1). The strap 120 may further include flexible segments (not shown) that are stretchable within the rigid segments 130 and 150 respectively to adjust the strap 120 in accordance with the user's head.

In some embodiments, the strap 120 comprises a back piece 160 coupled with the semi-rigid segment 140 to rest against the back of the user's head (e.g., around the user's occipital lobe). For example as shown in FIG. 1, the back piece 160 is in triangular shape with a hollow and triangular center. The semi-rigid piece 140 extends to wrap around a portion at the back of the user' head (e.g., around the user's occipital lobe). The semi-rigid piece 140 includes a portion that conforms to the shape of the back piece 160 and the back piece 160 is coupled to the portion of the semi-rigid piece 140 at the back of the user's head.

In some embodiments, the strap 120 comprises a top strap 170 coupled to the back piece 160 (or the semi-rigid segment 140) and the head-mounted display 400 to adjustably conform to the top of the user's head when the user is wearing the head-mounted display.

In some embodiments, various electrical connection mechanisms (e.g., flat flexible circuits and/or electric cables) are used in the head-mounted display system 100 to provide power management, signal transmission, and/or other functionalities to the head-mounted display 400 and the detachable audio subsystem 200. For example, the head-mounted display 400 is integrated with the detachable audio subsystem 200 using suitable electrical connection mechanisms to provide both visual and audio virtual-reality experiences to the user.

Various embodiments of the strap system 120 and the head-mounted display system 100 are described in U.S. patent application Ser. No. 14/603,335, filed on Jan. 22, 2015, and U.S. patent application Ser. No. 14/681,001, filed on Apr. 7, 2015, the disclosures of which are incorporated herein by reference in their entireties.

Various embodiments of the detachable audio subsystem 200 and coupling mechanisms between the detachable audio subsystem 200 and the head-mounted display system 100 are described in U.S. patent application Ser. No. 14/627,639, filed on Feb. 20, 2015, U.S. Provisional Patent Application No. 62/174,298, filed on Jun. 11, 2015, and U.S. Provisional Patent Application No. 62/174,359, filed on Jun. 11, 2015, the disclosures of which are incorporated herein by reference in their entireties.

Figure 2A:
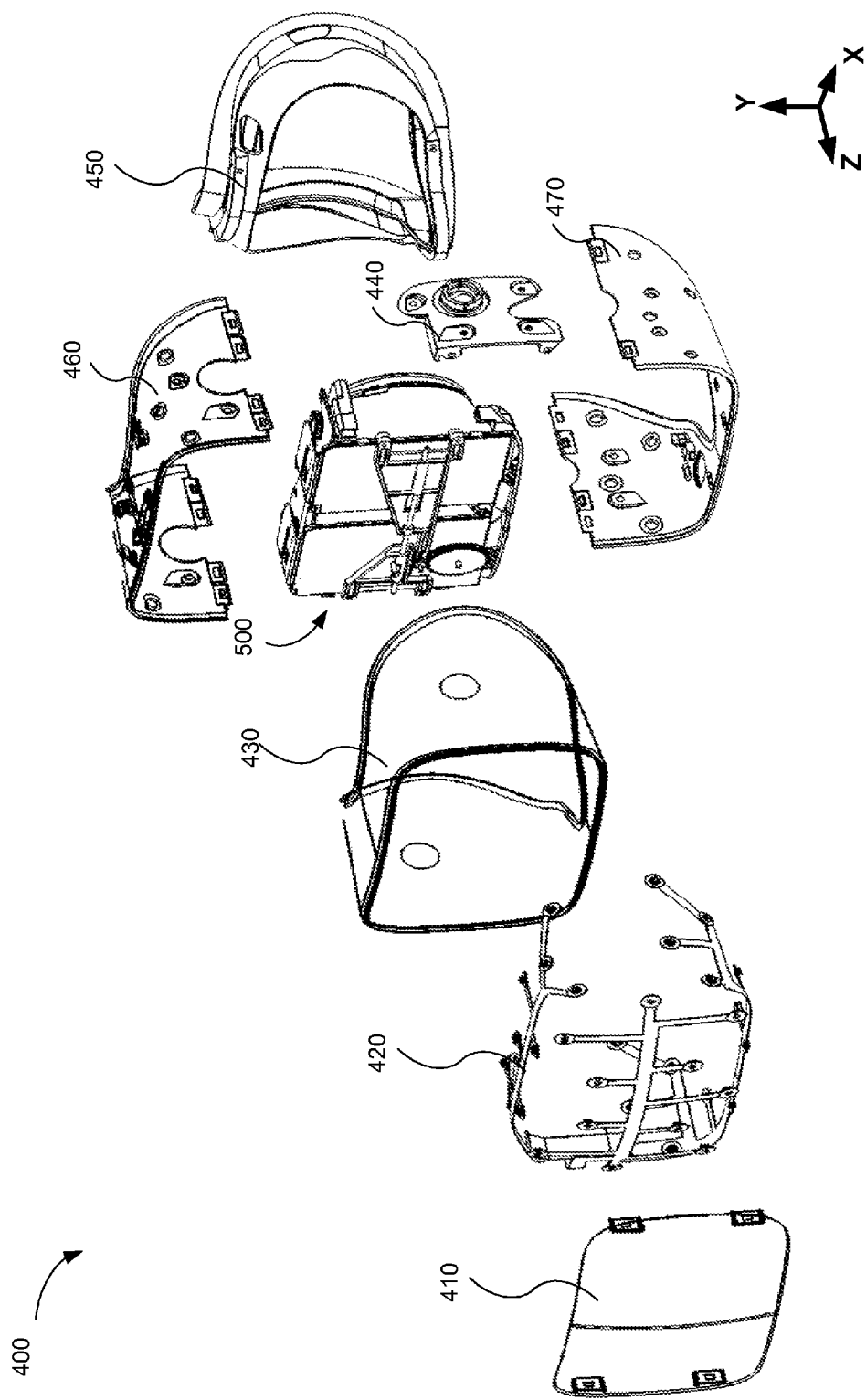
FIG. 2A is an exploded perspective view of a head-mounted display in accordance with some embodiments.

FIG. 2A is an exploded perspective view of the head-mounted display 400 in accordance with some embodiments. The head-mounted display 400 includes a front opaque cover 410 to cover the front of the head-mounted display 400, flexible circuits 420 distributed inside the head-mounted display 400, a fabric wrap 430 (e.g., which is opaque), and a foam 450 to rest against a user's face when the user wears the head-mounted display 400.

The head-mounted display 400 further includes a top housing 460 and bottom housing 470 (e.g., which are both opaque) to house an assembly 500, and one or more side mounting brackets 440 (e.g., on left side and right side) coupled between the assembly 500 and the top and bottom housings 460 and 470. The one or more side mounting brackets 440 are further coupled to one or more audio systems 200 in accordance with some embodiments. The fabric wrap 430 is glued to the outer surfaces of the top housing 460 and bottom housing 470 once the top housing 460 and bottom housing 470 have been assembled.

The head-mounted display 400 may also includes a plurality of infrared (IR) LED lights for sensing motions of the user's head in conjunction with an external camera. The flexible circuits 420 provide power management and transmit electrical signals among different components (e.g., display screens, IR LED lights, and detachable audio system 200) of the head-mounted display system 400.

In some embodiments, the front cover 410 is coupled to the assembly 500 using one or more connectors (e.g., screws). The front cover 410, top housing 460, and bottom housing 470, when connected, may be considered a single opaque housing of the head-mounted display 400. In some embodiments, the housing is opaque at visible wavelengths but not at infrared wavelengths.

FIGS. 2B-2I are perspective views of components of the head-mounted display 400 including the assembly 500 in accordance with some embodiments. The assembly 500 includes a left lens 510 for a user's left eye and a right lens 515 for the user's right eye. The assembly 500 further includes a left display screen 530 disposed in front of the left lens 510 to provide images to the user's left eye through the left lens 510. Similarly, the assembly 500 includes a right display screen 535 disposed in front of the right lens 515 to provide images to the user's right eye through the right lens 515. The left display screen 530 and the right display screen 535 can be light-emitting diode displays (LEDs), e-ink displays, plasma display panels (PDPs), liquid crystal displays (LCDs), organic light-emitting diode displays (OLED), or using any other suitable display technologies.

The assembly 500 includes a left eye cup 520 coupled between the left lens 510 and the left display screen 530, and a right eye cup 525 coupled between the right lens 515 and the right display screen 535. The assembly 500 further includes a top bracket 580 and a bottom bracket 570 to mount the assembly 500 to the top housing 460 and the bottom housing 470 as shown in FIG. 2A.

In the assembly 500, the left eye cup 520 and the right eye cup 525 are separate from each other. For example, each eye cup of the left eye cup 520 and the right eye cup 525 is mounted between the top bracket 580 and the bottom bracket 570 respectively. As shown in FIG. 2F-2G, the left eye cup 520, the left display screen 530, the right eye cup 525, and the right display screen 535 can fit in the grooves on the bottom bracket 570 and the grooves on the top bracket 580. The grooves allow linear motions of the left eye cup 520, the left display screen 530, the right eye cup 525, and the right display screen 535: the eye cups and displayer slide within the grooves on the bottom bracket 570 and the top bracket 580 along the X dimension.

Figure 2B:
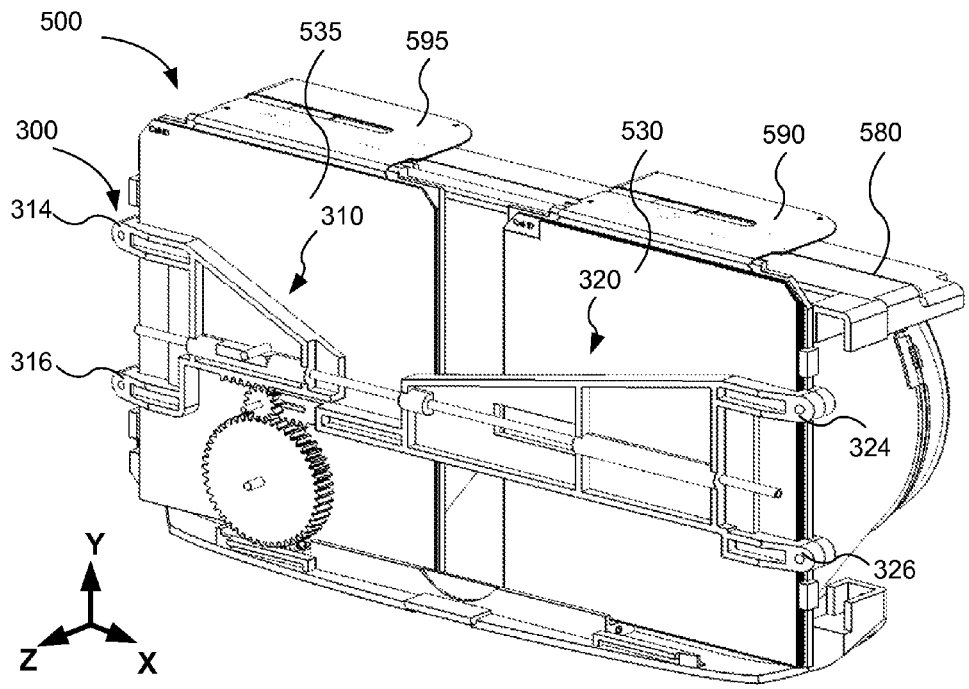
FIGS. 2B-2I are perspective views of components of a head-mounted display in accordance with some embodiments.
Figure 2C:
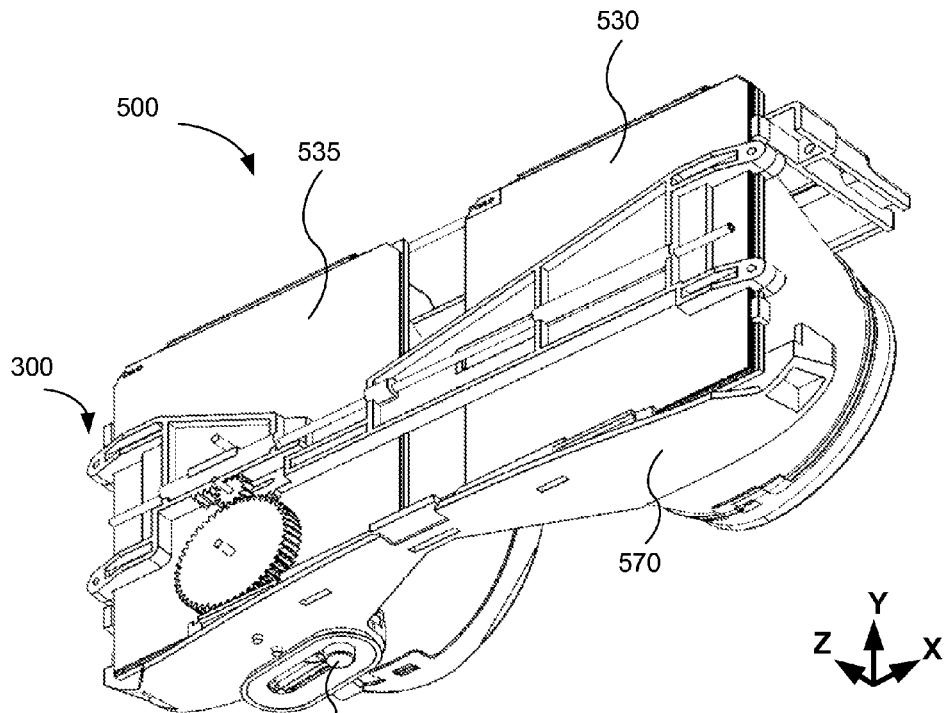
Figure 2D:
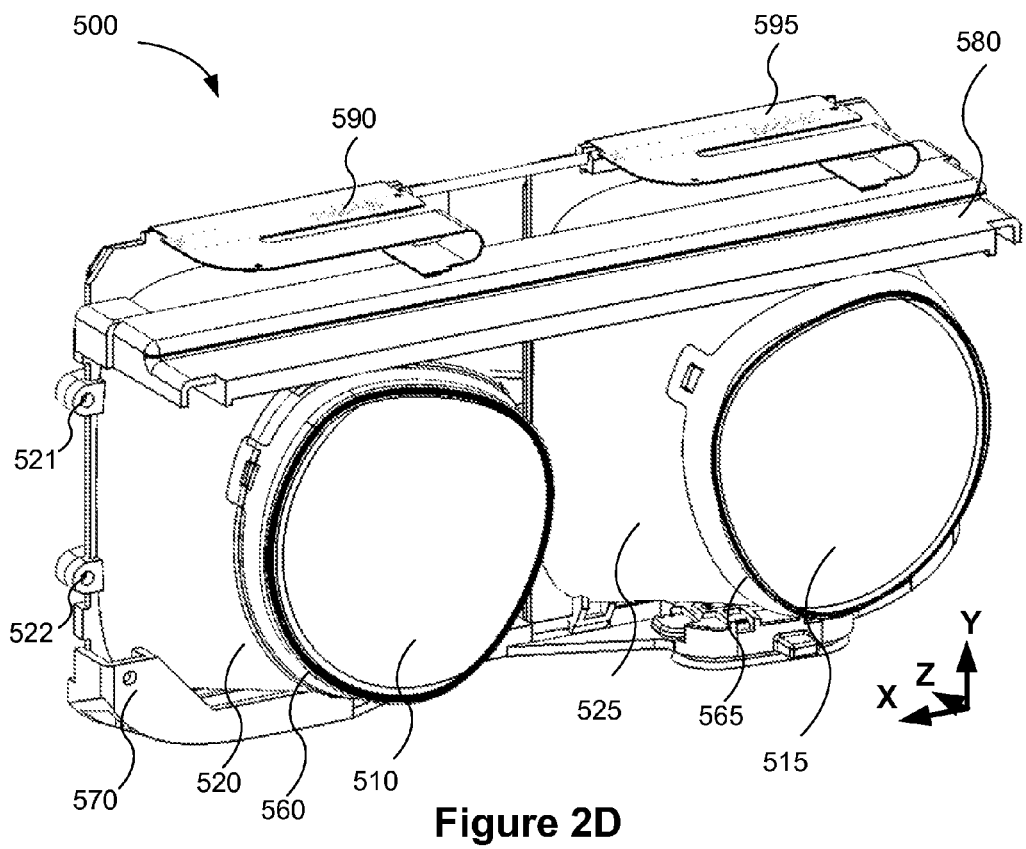
Figure 2E:
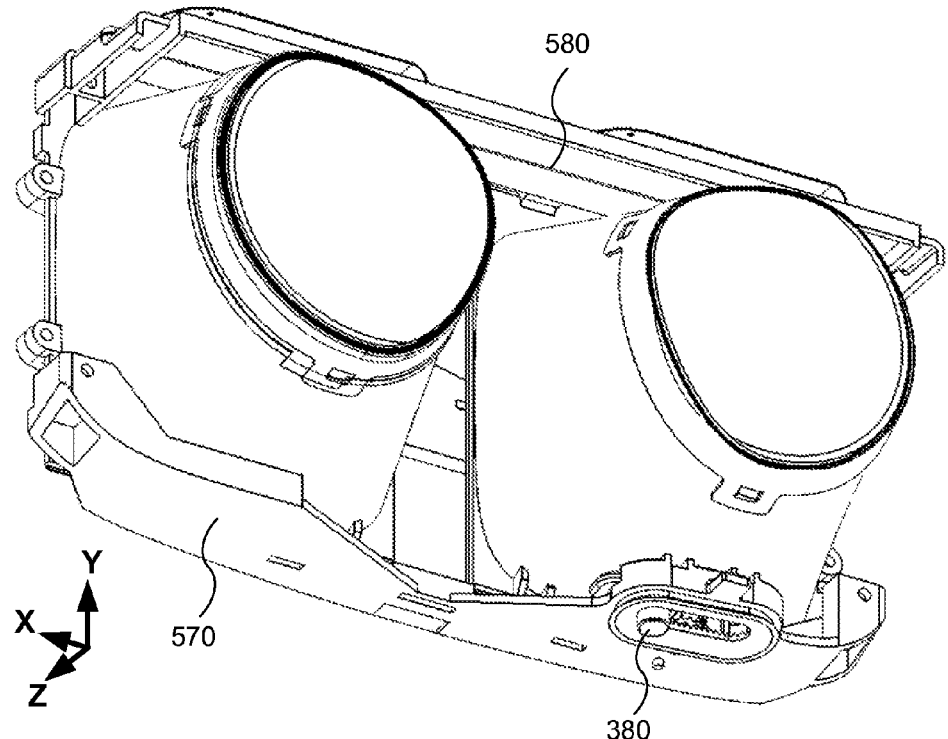
Figure 2G:
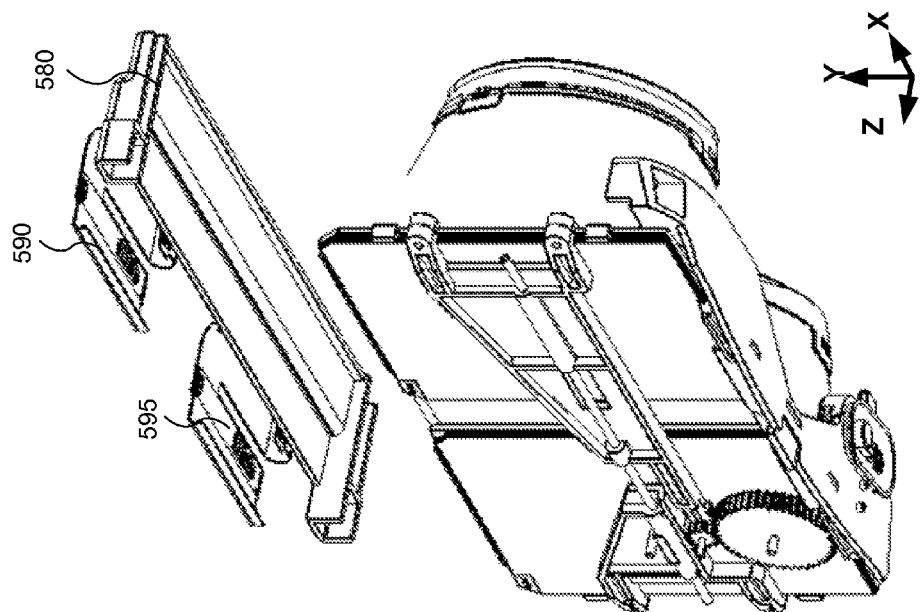
Figure 2F:
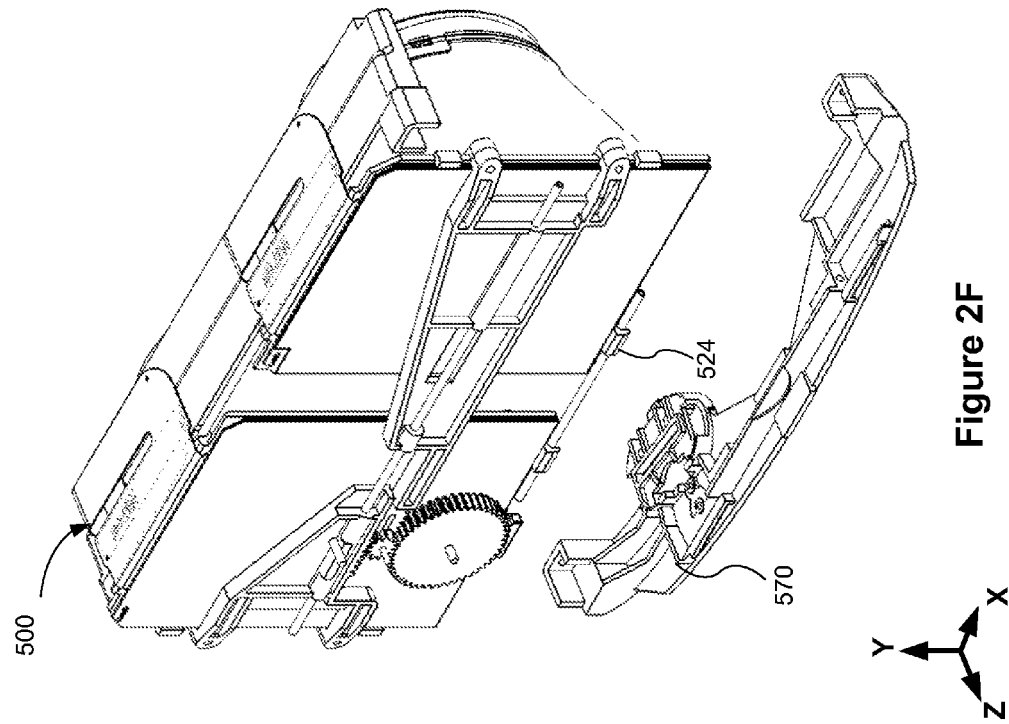
Figure 2H:
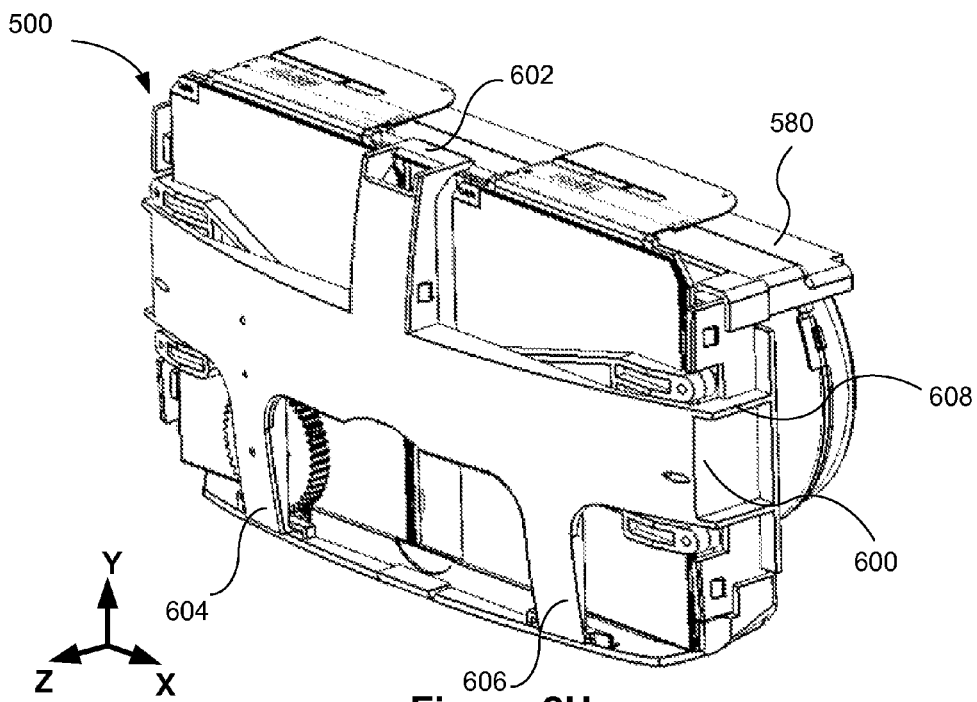
Figure 2I:
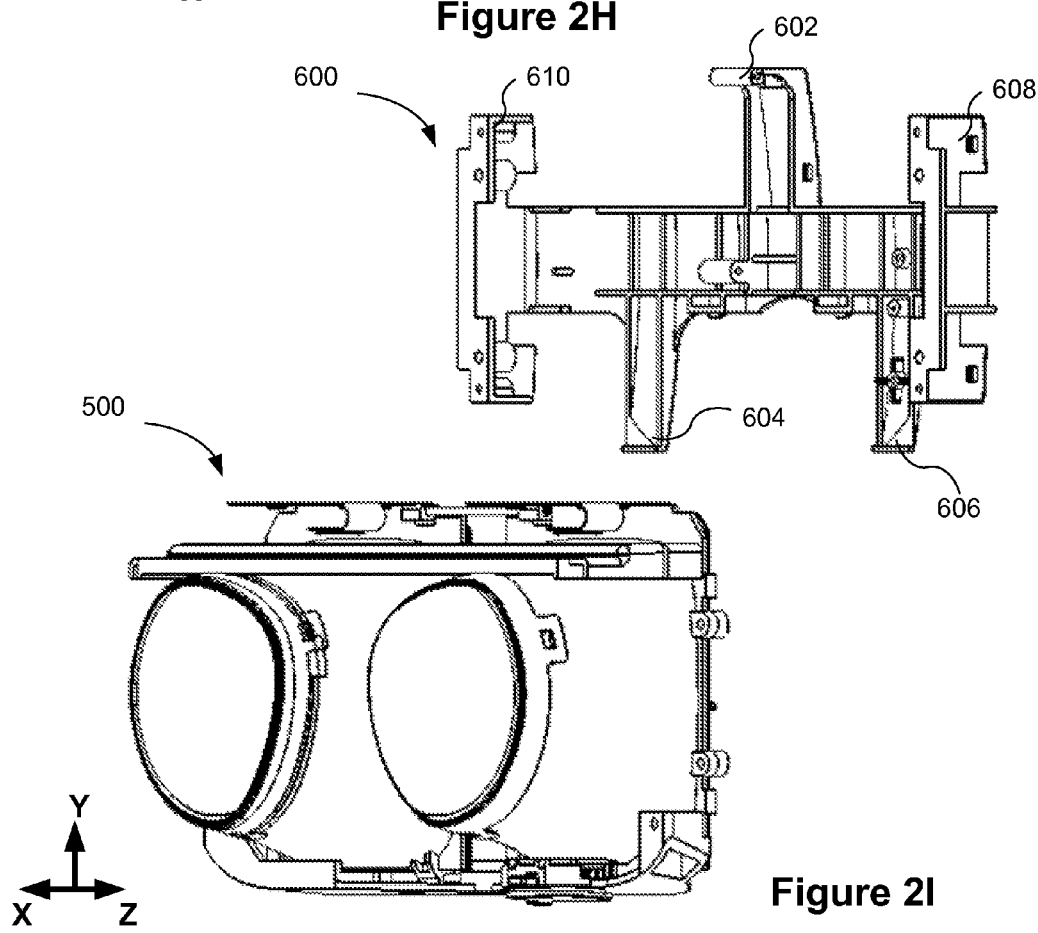

FIGS. 2H and 2I show the assembly 500 and a mounting structure 600 for the assembly 500 in accordance with some embodiments. The mounting structure 600 is coupled to the front of the assembly 500. The mounting structure 600 includes one or more brackets (e.g., brackets 602, 604, and 606) to couple the assembly 500 to the top bracket 580 and the bottom bracket 570 using one or more connectors (e.g., screws). The mounting structure 600 also includes side brackets (e.g., brackets 608 and 610) to couple the components (e.g., the corresponding display screen and the eye cup) together using one or more connectors (e.g., screws).

The assembly 500 further includes a left flexible circuit 590 and a right flexible circuit 595 to provide power and/or electrical signals (e.g., from driver circuitry) to the left display screen 530 and the right display screen 535.

In some embodiments, a lateral distance between the left eye cup 520 and the right eye cup 525, and a lateral distance between the left display screen 530 and the right display screen 535 are adjustable using a gear train. This lateral distance corresponds to an interpupillary distance, which is thus adjustable.

For example, as illustrated in FIGS. 2B-2C, the assembly 500 includes a position adjustment mechanism 300 coupled to the left display screen 530, the left eye cup 520, the right display screen 535, and the right eye cup 525. (Alternatively, the assembly 500 may include a position adjustment mechanism that is mirrored with respect to the position adjustment mechanism 300.) The position adjustment mechanism 300 includes one or more racks coupled with one or more gears.

A linear motion of a button 380 (e.g., a sliding button) can be transferred to linear motions of mounting members coupled to the display screens and the eye cups via a gear train. The button 380 can be slid to adjust a lateral distance between the left display screen 530 and the right display screen 535, and a lateral distance between the left eye cup 520 and the right eye cup 525. Various embodiments of the position adjustment mechanism 300 are further discussed later with reference to FIGS. 4A-4G.

Various embodiments of the head-mounted display 400 and the assembly 500 are described in U.S. Provisional Patent Application No. 62/175,877, filed on Jun. 15, 2015, the disclosure of which is incorporated herein by reference in its entirety.

FIGS. 3A-3B are exploded views illustrating components of the assembly 500 for the head-mounted display 400 in accordance with some embodiments. While some example features are illustrated in FIGS. 3A-3B to show the components of the assembly 500 for one eye (e.g., the right eye) of a user, as shown in FIGS. 2B-2I, the components of the assembly 500 for the other eye (e.g., the left eye) may substantially mirror (e.g., to within manufacturing tolerances) the structures illustrated in FIGS. 3A-3B. The components for the other eye have not been illustrated for the sake of brevity and so as not to obscure pertinent aspects of the example embodiments disclosed herein.

As illustrated in FIGS. 3A-3B, for a user's right eye, the assembly 500 includes the right eye cup 525 and the right lens 515 coupled to one end of the right eye cup 525. In some embodiments, the right lens 515 is glued to the right eye cup 525. In some embodiments, a right mounting ring 565 is used to mount an internal fabric (not shown) for the head-mounted display. The internal fabric is glued to the right mounting ring 565, which is snapped onto the right eye cup 525. For example, as shown in FIGS. 3A-3B, the right mounting ring 565 includes apertures 567 to couple to protrusions 527 on the right eye cup 525. Alternatively, the right mounting ring 565 mounts the right lens 515 to the right eye cup 525 (e.g., using apertures 567 and protrusions 527, or using glue). Similarly referring to FIGS. 2C-2D, the assembly 500 includes the left eye cup 520, the left lens 510, and a left mounting ring 560 configured in a similar manner as the right eye cup 525, right lens 515, and right mounting ring 565.

In some embodiments, stretchable fabrics (not shown) are connected to (e.g., stitched around) the left eye cup 520 and the right eye cup 525 such that when the user is using the head-mounted display system 100, components inside the head-mounted display 400 are covered to avoid any visual interference or confusion to the user.

As shown in FIGS. 3A-3B, the assembly 500 further includes a right frame 545 situated between the right eye cup 525 and the right display screen 535. A left frame (not shown) is also situated between the left eye cup 520 and the left display screen 530.

Figure 4A:
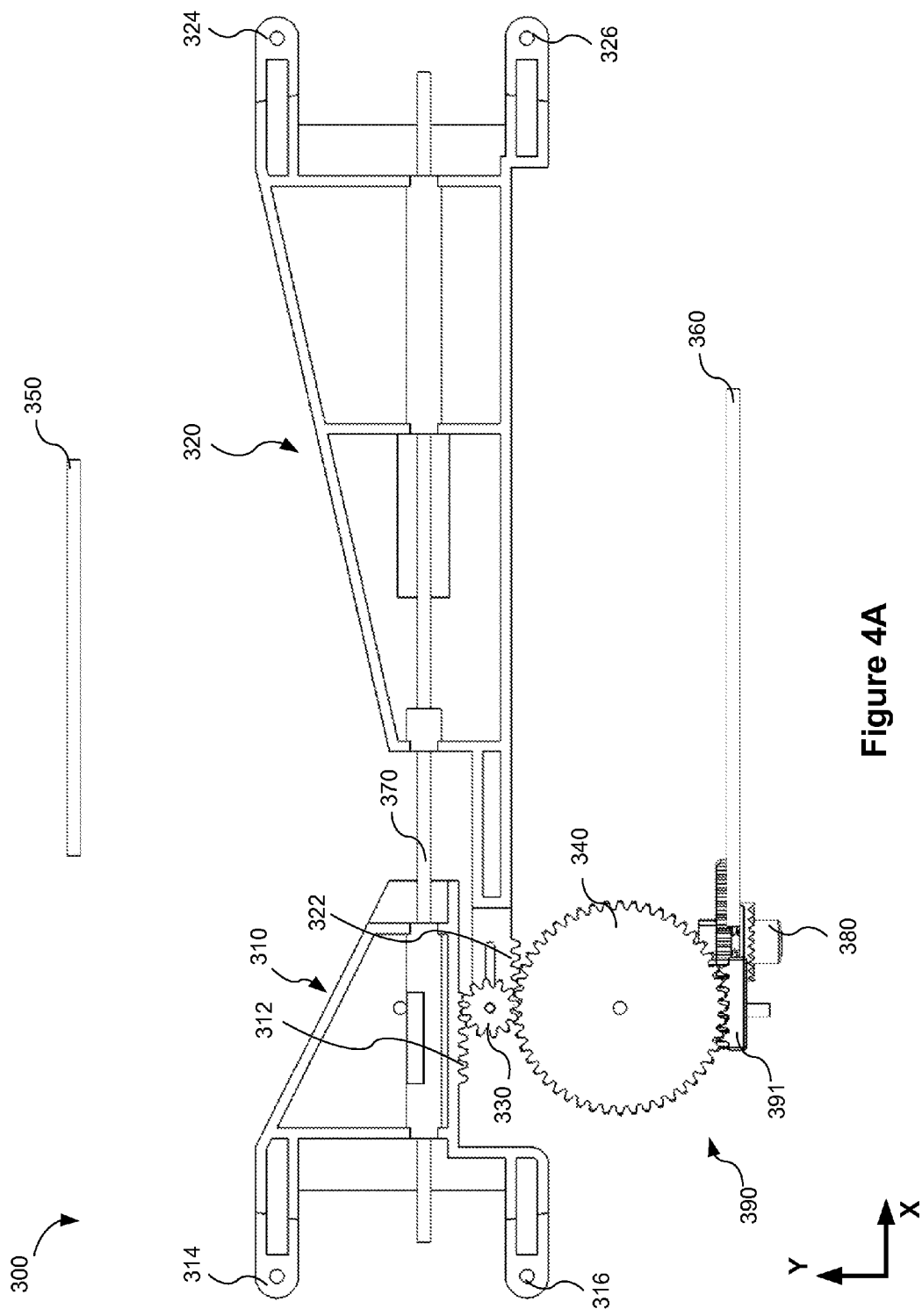
FIGS. 4A-4B are front and back views of a position adjustment assembly in a head-mounted display in accordance with some embodiments.
Figure 4B:
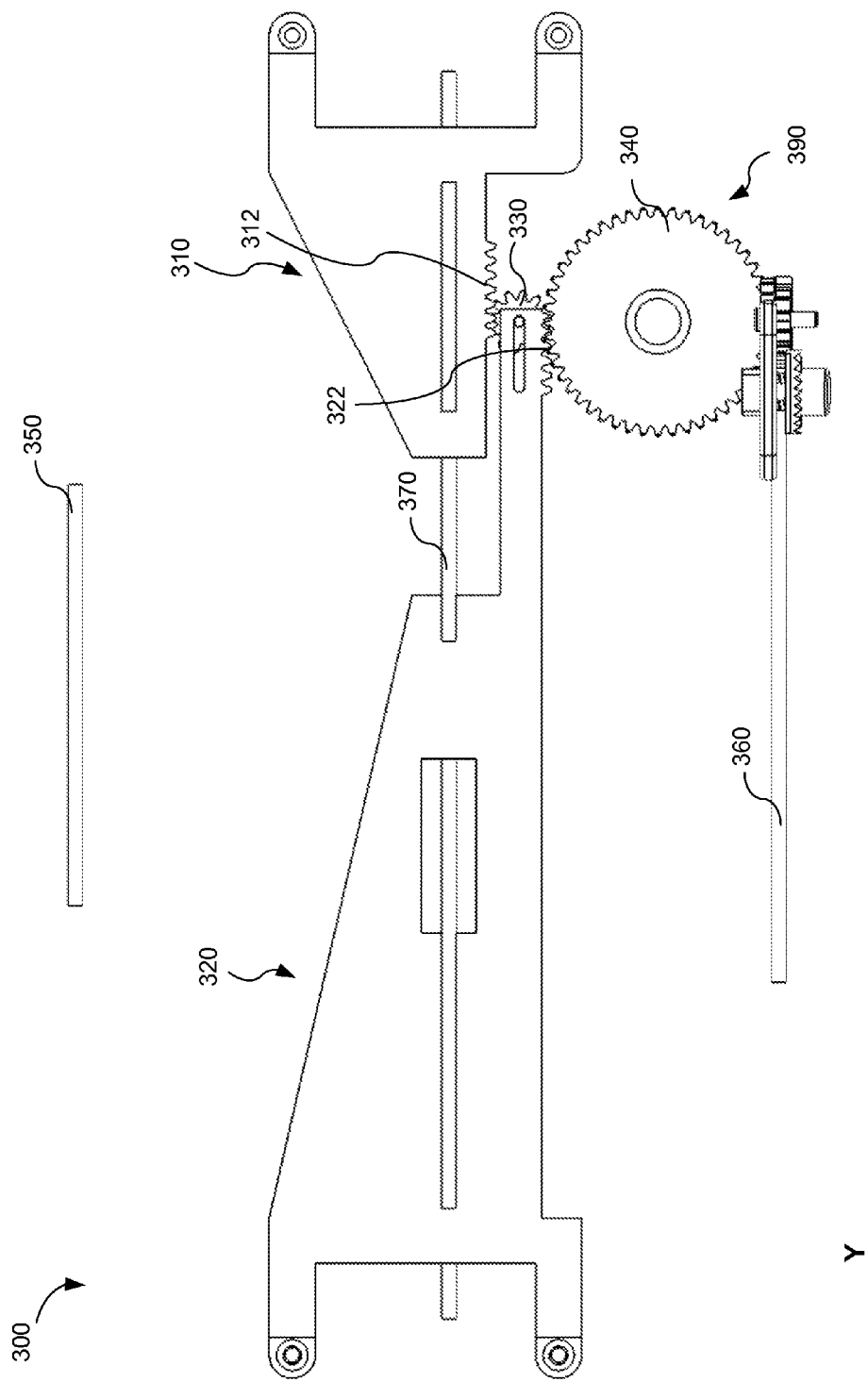

FIGS. 4A-4B are front and back views of the position adjustment assembly 300 in accordance with some embodiments. The position adjustment assembly 300 includes a member 310 with rack 312 and a member 320 with rack 322. As shown in FIG. 2B, the member 310 is coupled to the right display screen 535 and the member 320 is coupled to the left display screen 530.

In some embodiments, the right eye cup 525 is coupled to the member 310, and left eye cup 520 is coupled to the member 320. The right display screen 535 is disposed between the member 310 and the right eye cup 525. The left display screen 525 is disposed between the member 320 and left eye cup 520. In some embodiments, the position adjustment assembly 300 also includes the button 380 situated beneath the right eye cup 525.

The position adjustment assembly 300 also includes a gear train 390 to transfer a linear sliding motion of the button 380 to a linear motion of the rack 312 and a linear motion of the rack 322. The linear motion of the rack 312, resulting from sliding the button 380, is opposite to the linear motion of the rack 322. The position adjustment assembly 300 further includes a gear 330 engaged with the rack 312 and a gear 340 concurrently engaged with the gear 330 and the rack 322. For example, as shown in FIG. 4B, the gear 330 and the rack 322 are aligned next to each other to engage with the gear 340. In some embodiments, a diameter of the gear 340 is greater than a diameter of the gear 330.

In some embodiments, the member 310 rigidly connects the rack 312 to the right display screen 535 and the right eye cup 525. The member 320 rigidly connects the rack 322 to the left display screen 530 and the left eye cup 520. For example, as shown in FIGS. 2B-2D, the member 320 includes protrusions 324 and 326 with apertures to rigidly connect to the apertures on the protrusions 521 and 522 on the left eye cup 520 using one or more connectors (e.g., screws). Similary, the member 310 includes protrusions 314 and 316 with apertures to rigidly connect to the apertures on the protrusions on the right eye cup 525 using one or more connectors (e.g., screws). Therefore the distance between the left and right display screens and the distance between the left and right eye cups, and thus the interpupillary distance for the head-mounted display 400, can be adjusted by adjusting the distance between the member 310 and the member 320 and the distance between the rack 312 and the rack 322.

In some embodiments, as shown in FIG. 4A, when the gear 340 rotates in a clockwise direction, the rack 322 moves linearly toward the +X direction. The gear 340 triggers the gear 330 to rotate in a counter-clockwise direction, and the rack 312 engaged with the gear 330 moves linearly toward the −X direction (i.e., opposite to the direction that the rack 322 moves toward). A lateral distance between the member 310 and the member 320 increases. Thus the i distance between the right display screen 535 and the left display screen 530, and the interpupillary distance, increases.

When the gear 340 rotates in a counter-clock wise direction, the gear 330 is actuated to rotate in a clockwise direction. The rack 322 moves linearly toward the −X direction and the rack 312 moves linearly toward the +X direction to reduce the distance between the right display screen 535 and the left display screen 530, and thus the interpupillary distance.

Figure 4C:
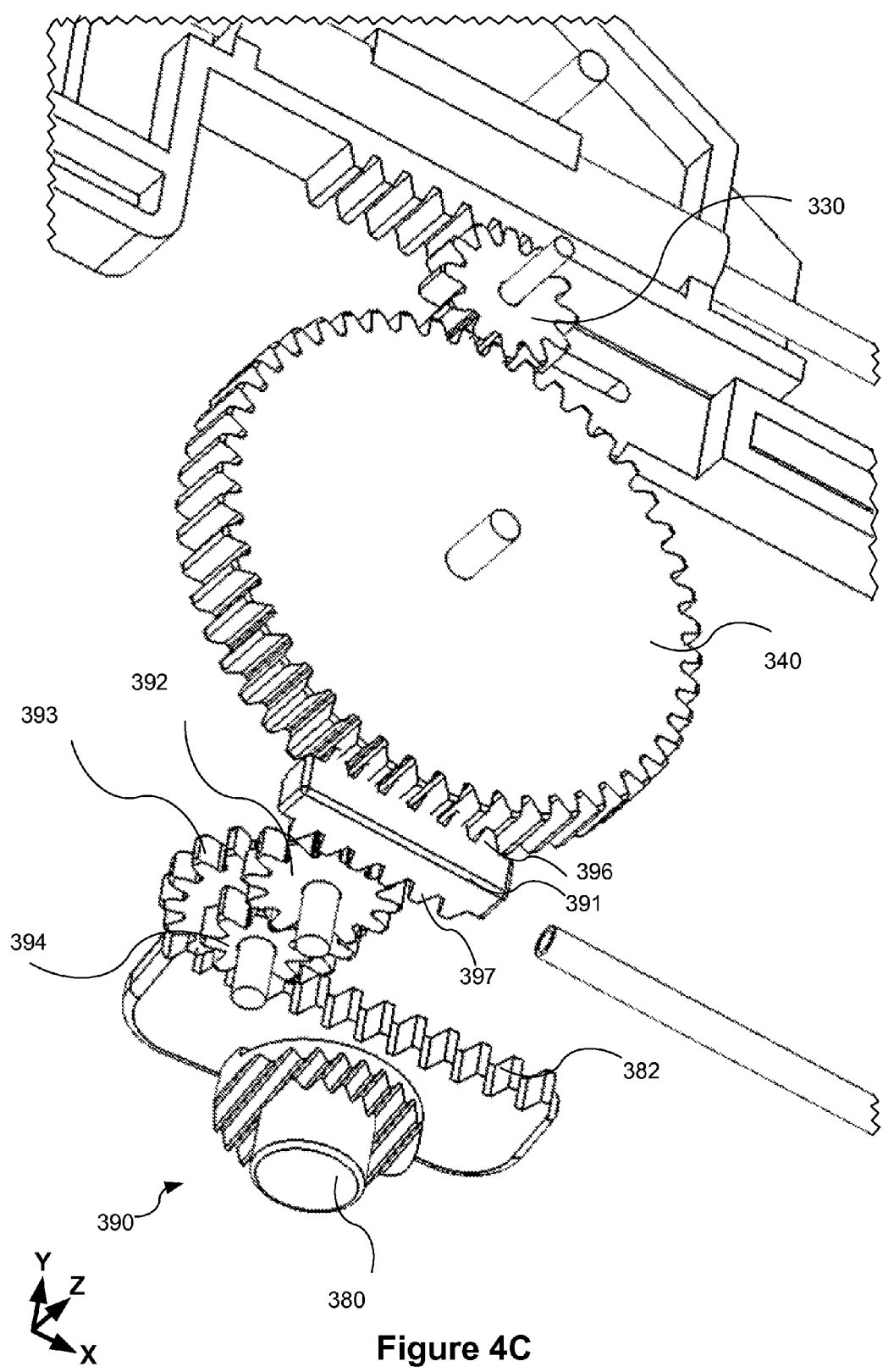
FIG. 4C is a perspective view of a gear train in the position adjustment assembly of a head-mounted display in accordance with some embodiments.

FIG. 4C is a perspective view of the gear train 390 in accordance with some embodiments. The gear train 390 further includes a gear 392, a gear 394, and a gear 393 each aligned perpendicular to the gears 330 and 340.

The position adjustment assembly 300 further includes a rack 391 disposed between the gear 340 and the gear 392. The rack 391 includes a group of teeth 396 and a group of teeth 397 distributed on two different edges. Each tooth of the group of teeth 396 is perpendicular to each tooth of the group of teeth 397. The group of teeth 396 are engaged with the gear 340 and the group of teeth 397 are engaged with the gear 392. The gear 340 is situated between the rack 391 and the gear 330.

As shown in FIG. 4C, the gear 394 is engaged with the gear 392. The gear 393 is coaxial with the gear 394. In some embodiments, a diameter of the gear 393 is greater than a diameter of the gear 394. The position adjustment assembly 300 further includes a rack 382 with a group of teeth engaged with the gear 393.

Figure 4D:
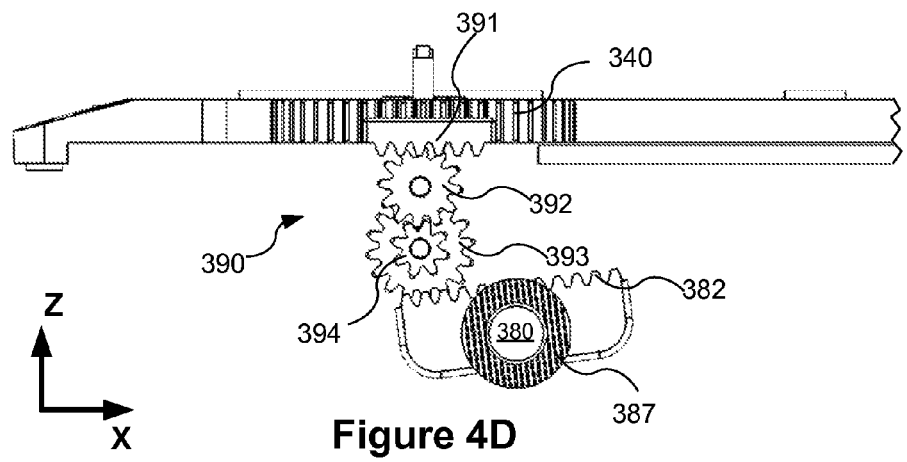
FIG. 4D is a bottom view of a sliding button coupled with a gear train in a position adjustment assembly in a head-mounted display in accordance with some embodiments.
Figure 4E:
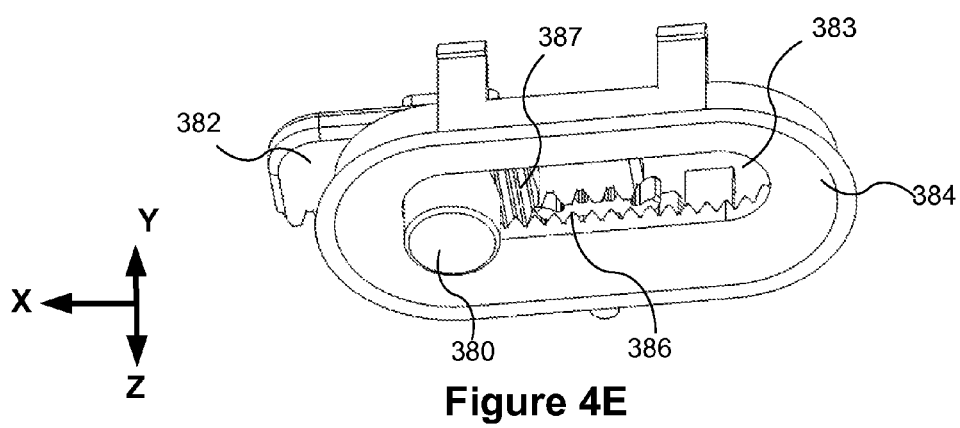
FIG. 4E is a perspective view of a sliding button in a position adjustment assembly in a head-mounted display in accordance with some embodiments.
Figure 4F:
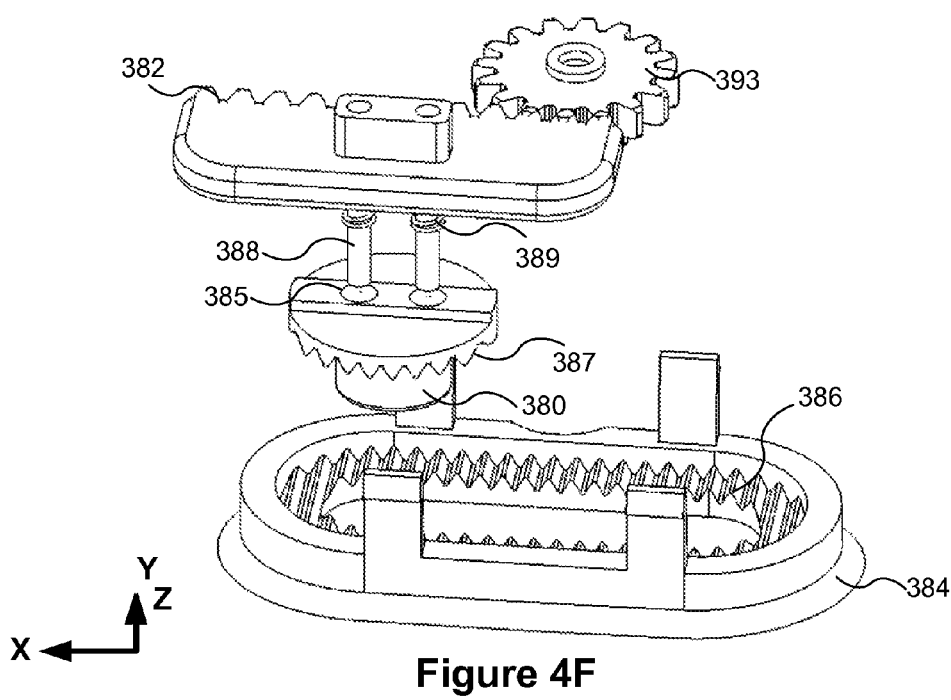
FIG. 4F is an exploded perspective view illustrating components of a sliding button in a position adjustment assembly in a head-mounted display in accordance with some embodiments.

FIG. 4D is a bottom view of the button 380 coupled with the gear train 390 in accordance with some embodiments. FIG. 4E is a perspective view of the button 380 in accordance with some embodiments. FIG. 4F is an exploded perspective view illustrating components of the button 380 in accordance with some embodiments.

In some embodiments as shown in FIG. 4F, a head of the button 380 includes an upper surface 385 with one or more holes to receive one or more protrusions 388 (e.g., posts, pins) extending from the lower surface of the rack 382. The one or more protrusions 388 are connected to the lower surface of the rack using one or more springs 389. The head of the button 380 also includes a plurality of teeth on a lower surface 387 opposite to upper surface 385.

As shown in FIG. 4E, a cover 384 includes an opening 383 for the button 380 to extend outward from the opening 383. In some embodiments, the opening 383 is an opening in the bottom of the head-mounted display 400. As shown in FIG. 4F, the opening 383 includes an inner edge 386 with a plurality of teeth to engage with the plurality of teeth of the lower surface 387 of the button 380.

In some embodiments, when the button 380 is pushed upward to compress the one or more springs 389 toward the rack 382, the plurality of teeth on the lower surface 387 of the button 380 disengage with the plurality of teeth on the inner edge 386 to allow a linear sliding motion of the button 380 within the opening 383.

For example as illustrated in FIGS. 4C-4F, in order to slide the button 380 within the opening 383, the user pushes the button 380 upward to deform the springs 389 to disengage the plurality of teeth on the inner edge 386 from the plurality of teeth on the lower surface 387.

Because the button 380 is coupled to the rack 382 by the one or more protrusions 388, when button 380 slides linearly within the opening 383 of the cover 384, the rack 382 slides together with button 380. Thus the linear motion of the rack 382 can be transferred to the rotation motion of the gear 393. Because the gear 393 is co-axial with the gear 394, the rotation of the gear 393 triggers the rotation motion of the gear 394 at the same angular speed as the gear 393.

Because the gear 394 is engaged with the gear 392, the rotation of the gear 394 triggers the rotational motion of the gear 392. Because the gear 392 is engaged with the rack 391, the rotation of the gear 392 triggers a linear motion of the rack 391. The rack 391 is further engaged to the gear 340 to transfer its linear motion to the rotation of the gear 340.

The rotation of the gear 340 is then transferred to the rotation of gear 330 and a linear motion of the rack 322, which is further coupled to and thus enables linear motions of the left eye cup 520 and the left display screen 530. The rotation of the gear 330 is transferred to a linear motion of the rack 312, which is coupled to and thus enables linear motions of the right eye cup 525 and the right display screen 535.

In some embodiments, the left display screen 530 and the right display screen 535 can move concurrently toward each other or apart from each other in response to the linear sliding motion of the button 380.

After the user is satisfied with the interpupillary distance as adjusted, the user releases the button 380. The button 380 locks at the selected position by the engagement between the plurality of teeth on the inner edge 386 and the plurality of teeth on the lower surface 387, which results from extension of the one or more springs 389 when the button 380 is released.

Figure 4G:
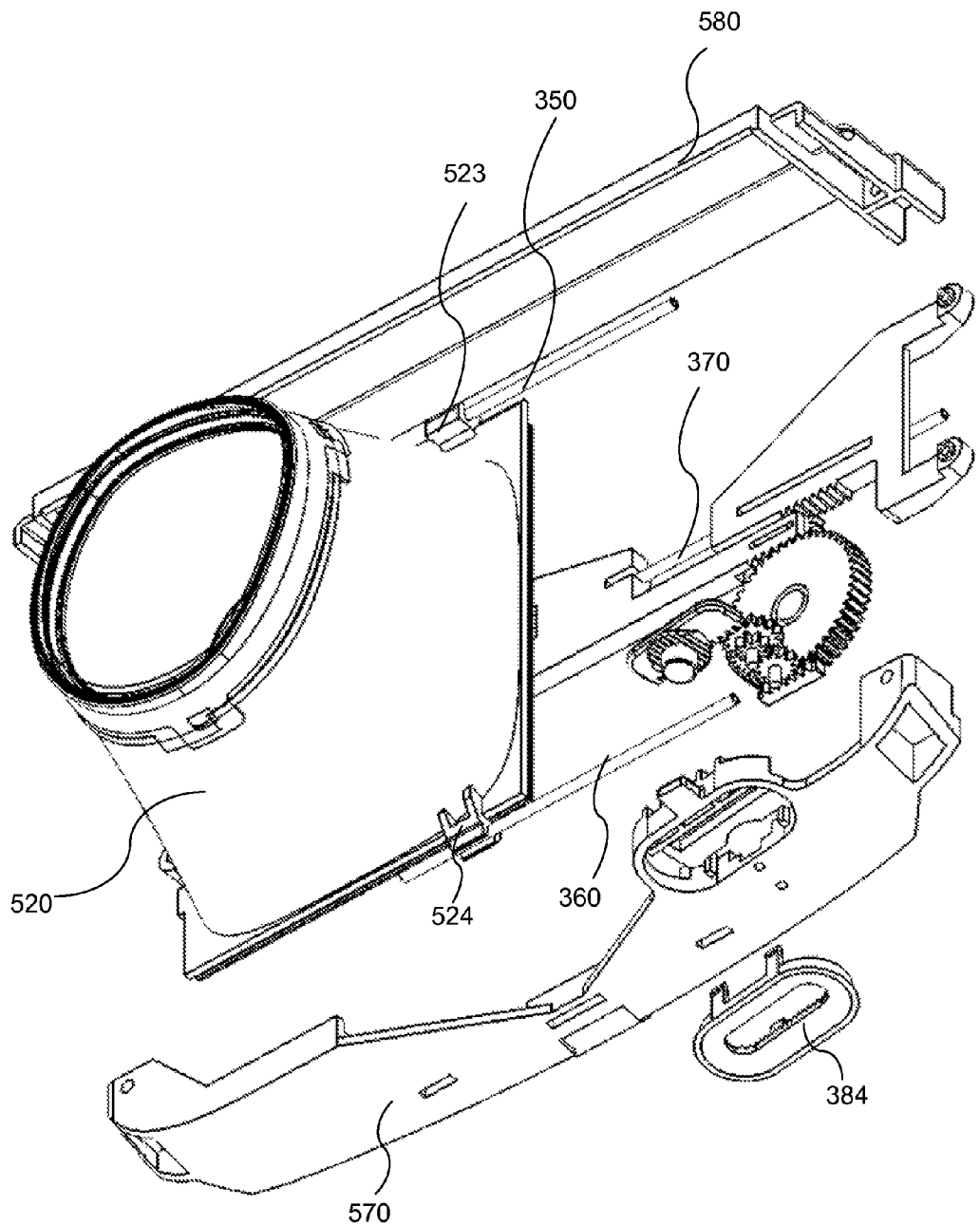
FIG. 4G is a perspective view illustrating components of a head-mounted display in accordance with some embodiments.

FIG. 4G is a perspective view illustrating components of the assembly 500 in accordance with some embodiments. Components specific to the right eye are omitted from FIG. 4G for clarity. As shown in FIGS. 4A-4B and 4G, the position adjustment assembly 300 includes a top rail 350 coupled to a top edge of the left eye cup 520 and a top edge of the right eye cup 525. The position adjustment assembly 300 also includes a bottom rail 360 coupled to a bottom edge of the left eye cup 520 and a bottom edge of the right eye cup 525. The top rail 350 is parallel to the bottom rail 360. The top edge of the left eye cup 520 is parallel to the bottom edge of the left eye cup 520. The top edge of the right eye cup 525 is parallel to the bottom edge of the right eye cup 525. For example as shown in FIG. 4G, the left eye cup 520 includes a bracket 523 on the top edge and a bracket 524 on the bottom edge. The bracket 523 is used to couple the left eye cup 520 to the top rail 350, and the bracket 524 is used to couple the left eye cup 520 to the bottom rail 360.

As shown in FIGS. 4A-4B and 4G, the position adjustment assembly 300 also includes a middle rail 370 located between and parallel to the top rail 350 and the bottom rail 360. The middle rail 370 is coupled to the member 310 and the member 320. For example, the middle rail 370 inserts through hollow structures on the member 320 and the member 310 such that the middle rail 370 can be used to guide linear motions of the member 310 and the member 320 along the middle rail 370.

The top rail 350 and the bottom rail 360 are also positioned to guide linear motions of the left eye cup 520, the left display screen 530, the right eye cup 525, and the right display screen 535. For example, the brackets 523 and 524 of the left eye cup 520 can slide along the top rail 350 and the bottom rail 360 respectively. The right eye cup 525 also includes brackets 526 and 528 as shown in FIG. 3A to couple the right eye cup 525 to the top rail 350 and the bottom rail 360 respectively. The brackets 526 and 528 can slide along the top rail 350 and the bottom rail 360 respectively.

In some embodiments, as shown in FIGS. 2F and 4G, the bottom bracket 570 (e.g. a bottom holder) includes suitable structures and grooves to couple to the left eye cup 520 and the right eye cup 525, the left display screen 530 and the right display screen 535, the gear train 390, the button 380, and the bottom rail 360. For example, the bottom bracket 570 includes hollow structures for the bottom rail 360 to insert through to fixedly couple to the bottom rail 360. The cover 384 is coupled to a concave structure on the bottom bracket 570.

In the present disclosure, the gear train and the sliding button 380 are situated in front of and below the right eye cup 525 as exemplary embodiments. A gear train and a sliding button used for adjusting interpupillary distance can also be situated in front of and at the bottom of the left eye cup 520 or in the middle between the right eye cup 525 and the left eye cup 520. However, when the gear train and the sliding button is situated in front of and at the bottom of the left or right eye cup, as opposed to in the center of the head-mounted display, space for other structures (e.g., a camera) can be saved in the center of the head-mounted display.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display comprising:
    a first display screen and a second display screen to display images to respective eyes of a user;
    a first member comprising a first rack having teeth, the first member coupled to the first display screen;
    a second member comprising a second rack having teeth, the second member coupled to the second display screen;
    a button to be slid to adjust a distance between the first and second display screens; and
    a gear train, coupled to the button, to transfer a linear sliding motion of the button to a linear motion of the first rack in a first direction and a linear motion of the second rack in a second direction opposite to the first direction, the gear train comprising:
        a first gear having teeth engaged with teeth of the first rack; and
        a second gear having teeth engaged with teeth of the first gear and teeth engaged with teeth of the second rack.

2. The head-mounted display of claim 1, wherein:
    the first member rigidly connects the first rack to the first display screen; and
    the second member rigidly connects the second rack to the second display screen.

3. The head-mounted display of claim 1, wherein the first display screen and the second display screen are configured to move concurrently toward each other or apart from each other in response to the linear sliding motion of the button.

4. The head-mounted display of claim 1, wherein the gear train further comprises:
    a third gear having teeth and aligned perpendicular to the first and second gears; and
    a third rack comprising:
        a first group of teeth engaged with teeth of the second gear; and
        a second group of teeth engaged with teeth of the third gear, the first group of teeth perpendicular to the second group of teeth;
    wherein the second gear is situated between the third rack and the first gear.

5. The head-mounted display of claim 4, wherein the gear train further comprises:
    a fourth gear having teeth engaged with teeth of the third gear;
    a fifth gear coaxial with the fourth gear and having teeth; and
    a fourth rack having teeth engaged with teeth of the fifth gear.

6. The head-mounted display of claim 5, wherein a diameter of the fifth gear is greater than a diameter of the fourth gear.

7. The head-mounted display of claim 5, wherein the button comprises:
    a first surface coupled to the fourth rack via one or more springs; and
    a plurality of teeth on a second surface opposite to the first surface of the button.

8. The head-mounted display of claim 7, further comprising:
- a cover with an opening for the button to extend outward from the opening, the opening including an inner edge with a plurality of teeth to engage with the plurality of teeth of the second surface of the button,
- wherein the plurality of teeth on the second surface of the button is to disengage with the plurality of teeth of the edge of the opening when the button is pushed upward to compress the one or more springs toward the fourth rack, to allow the linear sliding motion of the button.

9. The head-mounted display of claim 1, further comprising:
- a first eye cup coupled to the first member, the first display screen being disposed between the first member and the first eye cup, and
- a second eye cup coupled to the second member, the second display screen being disposed between the second member and the second eye cup.

10. The head-mounted display of claim 9, further comprising:
- a first lens coupled to the first eye cup, the first eye cup being disposed between the first lens and the first display screen; and
- a second lens coupled to the second eye cup, the second eye cup being disposed between the second lens and the second display screen.

11. The head-mounted display of claim 9, further comprising:
- a top rail coupled to a first edge of the first eye cup and a first edge of the second eye cup; and
- a bottom rail coupled to a second edge of the first eye cup and a second edge of the second eye cup,
- wherein the bottom rail is parallel to the top rail, the first edge of the first eye cup is parallel to the second edge of the first eye cup, and the first edge of the second eye cup is parallel to the second edge of the second eye cup.

12. The head-mounted display of claim 11, further comprising:
- a middle rail located between and parallel to the top rail and the bottom rail, the middle rail coupled to the first member and the second member to guide linear motions of the first member and the second member along the middle rail.

13. The head-mounted display of claim 11, wherein the top rail and the bottom rail are positioned to guide linear motions of the first display screen and the second display screen.

14. The head-mounted display of claim 11, further comprising a bottom holder coupled to the first and second eye cups, the first and second display screens, the gear train, and the bottom rail.

15. A head-mounted display comprising:
- a first eye cup and a second eye cup corresponding to respective eyes of a user;
- a first display screen coupled to the first eye cup and a second display screen coupled to the second eye cup, the first display screen and the second display screen to display images to the respective eyes of the user;
- a first member comprising a first rack having teeth, the first member coupled to the first eye cup to press the first display screen between the first member and the first eye cup;
- a second member comprising a second rack having teeth, the second member coupled to the second eye cup to press the second display screen between the second member and the second eye cup;
- a button to be slid to adjust a distance between the first and second display screens; and
- a gear train, coupled to the button, to transfer a linear sliding motion of the button to a linear motion of the first rack in a first direction and a linear motion of the second rack in a second direction opposite to the first direction, the gear train comprising:
  - a first gear having teeth engaged with teeth of the first rack; and
  - a second gear having teeth engaged with teeth of the first gear and teeth engaged with teeth of the second rack.

16. An assembly to position two displays to provide views to a user's eyes, the assembly comprising:
- a first member comprising a first rack having teeth, the first member to couple to a first display screen;
- a second member comprising a second rack having teeth, the second member to couple to a second display screen;
- a button to be slid to adjust a distance between the first and second display screens; and
- a gear train, coupled to the button, to transfer a linear sliding motion of the button to a linear motion of the first rack in a first direction and a linear motion of the second rack in a second direction opposite to the first direction, the gear train comprising:
  - a first gear having teeth engaged with teeth of the first rack; and
  - a second gear having teeth engaged with teeth of the first gear and teeth engaged with teeth of the second rack.

* * * * *